United States Patent
Son et al.

(10) Patent No.: US 12,027,709 B2
(45) Date of Patent: Jul. 2, 2024

(54) ANODE FOR LITHIUM RECHARGEABLE BATTERY AND LITHIUM RECHARGEABLE BATTERY INCLUDING THE SAME

(71) Applicant: LG Chem, Ltd., Seoul (KR)

(72) Inventors: Jeong Man Son, Daejeon (KR); Jung Sup Han, Daejeon (KR); Dong Jo Ryu, Daejeon (KR); Seon Hee Han, Daejeon (KR); Min Ah Kang, Daejeon (KR); Jungeun Woo, Daejeon (KR); Cheolhoon Choi, Daejeon (KR); Sungjin Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 728 days.

(21) Appl. No.: 17/262,073

(22) PCT Filed: Jun. 25, 2020

(86) PCT No.: PCT/KR2020/008293
§ 371 (c)(1),
(2) Date: Jan. 21, 2021

(87) PCT Pub. No.: WO2021/060674
PCT Pub. Date: Apr. 1, 2021

(65) Prior Publication Data
US 2021/0351410 A1    Nov. 11, 2021

(30) Foreign Application Priority Data

Sep. 24, 2019  (KR) .................. 10-2019-0117559

(51) Int. Cl.
| H01M 4/62 | (2006.01) |
| H01M 4/36 | (2006.01) |
| H01M 4/583 | (2010.01) |
| H01M 10/0525 | (2010.01) |

(52) U.S. Cl.
CPC .......... *H01M 4/622* (2013.01); *H01M 4/366* (2013.01); *H01M 4/583* (2013.01); *H01M 10/0525* (2013.01)

(58) Field of Classification Search
CPC ...... H01M 4/622; H01M 4/366; H01M 4/583; H01M 10/0525
See application file for complete search history.

(56) References Cited

U.S. PATENT DOCUMENTS

| 2005/0130040 A1 | 6/2005 | Yang et al. |
| 2012/0009475 A1 | 1/2012 | Nakura |
| 2013/0170100 A1 | 7/2013 | Lee et al. |
| 2013/0216891 A1 | 8/2013 | Byun et al. |
| 2018/0205064 A1 | 7/2018 | Lee et al. |
| 2018/0287145 A1 | 10/2018 | Lee et al. |
| 2019/0139714 A1 | 5/2019 | Shin et al. |
| 2020/0365878 A1 | 11/2020 | Ishikawa et al. |

FOREIGN PATENT DOCUMENTS

| CN | 102362375 A | 2/2012 |
| JP | 2004-079370 A | 3/2004 |
| JP | 2013171838 A | 9/2013 |
| JP | 2016213057 A | 12/2016 |
| KR | 20050047242 A | 5/2005 |
| KR | 101214727 B1 | 12/2012 |
| KR | 20150005867 A | 1/2015 |
| KR | 20160133242 A | 11/2016 |
| KR | 20170075963 A | 7/2017 |
| KR | 20180009084 A | 1/2018 |
| KR | 20190060713 A | 6/2019 |
| KR | 101995373 B1 | 9/2019 |
| WO | 2015133154 A1 | 9/2015 |
| WO | 2019-103573 A1 | 5/2019 |
| WO | 2019131195 A1 | 7/2019 |

OTHER PUBLICATIONS

International Search Report for PCT/KR2020/008293, dated Jun. 25, 2020, 8 pages.
Extended European Search Report for Application No. 20829529.5, dated Sep. 15, 2021, 7 pages.
Search Report dated Dec. 5, 2023 from Office Action for Chinese Application No. 2020800039999 dated Dec. 8, 2023. 2 pgs.

*Primary Examiner* — James Lee
(74) *Attorney, Agent, or Firm* — Lerner David LLP

(57) ABSTRACT

An anode for a lithium rechargeable battery and a lithium rechargeable battery including the same are provided. Specifically, a plurality of anode active material layers are sequentially stacked on an anode current collector, and in the innermost layer directly contacting the anode current collector, polyolefin-based polymer is applied as a binder, and in the other layers, heterogeneous polymers are applied as binders.

13 Claims, No Drawings

ANODE FOR LITHIUM RECHARGEABLE BATTERY AND LITHIUM RECHARGEABLE BATTERY INCLUDING THE SAME

CROSS REFERENCE TO RELATED APPLICATIONS

The present application is a national stage entry under 35 USC § 371 of International Application No. PCT/KR2020/008293 filed on Jun. 25, 2020, which claims priority to Korean Patent Application No. 10-2019-0117559 filed on Sep. 24, 2019, wherein the entire contents of the disclosures are incorporated herein in their entirety.

TECHNICAL FIELD

The present disclosure relates to an anode for a lithium rechargeable battery and a lithium rechargeable battery including the same.

BACKGROUND ART

Recently, with the expansion of the application fields of lithium rechargeable batteries from small electronic devices to large devices such as an automobile, an electric power storage apparatus, and the like, the properties such as high energy density, low resistance, and long life, and the like are becoming a big issue in the development of lithium rechargeable batteries.

Particularly, regardless of the application field of lithium rechargeable batteries, there is a common demand for long life property minimizing capacity reduction even after repeated use, and in order to meet such a demand, various studies are on the progress. As one of them, there has been an attempt to improve mechanical, electrochemical properties of an anode.

Specifically, the anode comprises an anode active material layer formed on an anode current collector, and in the anode active material layer, anode active material, a binder, a conductive agent, and the like are included, thereby causing reversible electrochemical reactions of storing lithium ions and electrons in the anode active material during charge and releasing lithium ions and electrons from the anode active material during discharge.

If anode active material, binder, and the like are impregnated with an electrolyte during the reversible electrochemical reactions of an anode, the anode active material layer expands and is eliminated from the anode current collector, the resistance of the anode increases, and finally, the capacity of a lithium rechargeable battery gradually decreases.

Thus, there have been many attempts to improve the properties of an anode and inhibiting capacity reduction of a lithium rechargeable battery through the combinations of binders known so far (for example, styrene-butadiene-based polymer, styrene-acryl-based polymer, and the like).

However, the combination of binders known so far had a limitation in increasing the binding force of an anode and simultaneously lowering resistance, and thus, is considered to be insufficient for remarkably increasing lithium rechargeable battery life.

DISCLOSURE

Technical Problem

It is an object of the present disclosure to effectively improve anode property and ultimately, minimize capacity reduction during the operation of a lithium rechargeable battery, by forming anode active material layers in a multilayer structure, and applying different binders in each layer.

Technical Solution

According to one embodiment of the present disclosure, a plurality of anode active material layers are sequentially stacked on an anode current collector, and in the innermost layer directly contacting the anode current collector, polyolefin-based polymer is applied as a binder, and in the other layers, heterogeneous polymers are applied as binders.

Effect of the Invention

According to the one embodiment, by applying polyolefin-based polymer having small expansion to an electrolyte and high binding force with an anode current collector as a binder of the innermost layer, binding force between an anode current collector and innermost layer may be effectively increased, resistance of an anode including the same may be minimized, and capacity reduction during the operation of a lithium rechargeable battery may be inhibited.

In addition, according to the one embodiment, heterogeneous polymer capable of compensating the polyolefin-based polymer in terms of resistance, binding force and an interface with a separator, and the like, may be applied as binders of layers other than the innermost layer, and thus, more remarkable synergistic effect may be expected.

DETAILED DESCRIPTION OF THE EMBODIMENTS

Throughout the specification, unless otherwise defined, "copolymerization" means block copolymerization, random copolymerization, graft copolymerization, or alternating copolymerization, and "copolymer" means block copolymer, random copolymer, graft copolymer or alternating copolymer.

When it is stated that a part such as a layer, a membrane, a region, a plate, and the like is "above" or "on" another part, not only a part may be "directly on" another part, but also yet another part may exist therebetween. To the contrary, when it is stated that any part is "directly on" another part, it means that yet another part does not exist therebetween.

Hereinafter, specific embodiments of the present disclosure will be explained in detail. However, these are presented only as the illustrations of the present disclosure, the present disclosure is not limited thereby, and the present disclosure is only defined by the claims described below.

Anode Binder for a Lithium Rechargeable Battery

According to one embodiment of the present disclosure, there is provided an anode for a lithium rechargeable battery comprising an anode current collector; and a plurality of anode active material layers sequentially stacked on the anode current collector, wherein among the plurality of anode active material layers, the innermost layer directly contacting the anode current collector comprises polyolefin-based polymer as a binder, and the other layers comprise heterogeneous polymer as a binder.

In general, with repeated contraction and expansion of the volume of anode active material, binding force by a binder may be weakened.

Such a phenomenon may be further worsen as a binder has higher affinity to an electrolyte. As a binder has higher affinity to an electrolyte, more electrolyte may be impregnated inside, and it may become difficult to accept volume change of active material.

Furthermore, as the binding force by a binder in an anode is weakened, resistance may be further increased, and a battery including the same may be deteriorated and an electrolyte may be irreversibly consumed.

Finally, if a binder having high affinity to an electrolyte is applied to an anode, binding force of the anode may be gradually weakened during the operation of a battery, resistance may increase, battery performance may be deteriorated, electrolyte may be irreversibly consumed and life may be shortened.

Thus, according to the one embodiment, by applying polyolefin-based polymer without affinity to an electrolyte as a binder of the innermost layer, little expansion may occur during electrolyte impregnation, and high binding force may be maintained even during the operation of a battery.

However, it is difficult for polyolefin-based polymer to lower internal resistance of a battery compared to styrene-acryl-based binder commonly known as an anode binder, and to realize high adhesion compared to styrene-butadiene-based binder.

Thus, in the one embodiment, one or more anode active material layers are further formed on the innermost layer, and heterogeneous polymer capable of compensating the polyolefin-based polymer in terms of resistance, binding force and an interface with an electrolyte is applied in each layer other than the innermost layer.

Overall, according to the one embodiment, since polyolefin-based polymer with small expansion to an electrolyte and high binding force with an anode current collector is applied as a binder of the innermost layer, binding force between the anode current collector and innermost layer may be effectively increased, resistance of an anode including the same may be minimized, and capacity reduction during the operation of a lithium rechargeable battery may be inhibited.

In addition, according to the one embodiment, since heterogeneous polymers capable of compensating the polyolefin-based polymer in terms of resistance, binding force, and an interface with an electrolyte may be applied as binders of layers other than the innermost layer, remarkable synergistic effect may be anticipated.

The structure of the anode of the one embodiment, components included therein, and the properties thereof will be explained in detail.

Structure

In the anode of the one embodiment, the number of stacked anode active material layers is not specifically limited as long as two or more layers are stacked to form a multilayer structure.

However, if the number of stacked anode active material layers is to be increased more than 4 layers, the process may become complicated and production cost may increase. Thus, the number of stacked anode active material layers may be 2 or 3.

Meanwhile, the anode of the one embodiment may be a single-side anode, and in this case, the anode active material layer may be included only on one side of the anode current collector.

On the other hand, the anode of the one embodiment may be a two sided anode.

In the anode of one embodiment, each anode active material layer basically comprises anode active material, and may further comprise a conductive agent so as to increase conductivity.

More specifically explaining the structure of the anode of one embodiment, the plurality of anode active material layers may have a bilayer structure comprising a first anode active material layer contacting one side or both sides of the anode current collector, and comprising first anode active material, a first conductive agent, and polyolefin-based polymer; and a second anode active material layer contacting the other side of the first anode active material layer, and comprising second anode active material, a second conductive agent, and heterogeneous polymer.

On the other hand, the plurality of anode active material layers may have a three-layer structure further comprising a third anode active material layer contacting the other side of the second anode active material layer, and comprising third anode active material, a third conductive agent, and heterogeneous polymer.

In the plurality of anode active material layers, materials other than binder (namely, anode active material, conductive agent, and the like) may be identical or different in each anode active material layer. For example, all of the first to third anode active materials may be identical, two of them may be identical and only one may be different, or three of them may be different. The first to third conductive agents are in the same manner. Specific examples of each material will be described below.

Binder of Inner Most Layer: Polyolefin-Based Polymer

First, among the materials constituting the anode of the one embodiment, polyolefin-based polymer included as a binder of the innermost layer will be explained.

As the polyolefin-based polymer, polyolefin-based polymers known in the art may be applied, and it is not specifically limited as long as it is commercially available and easily obtainable in the art.

To the contrary, the polyolefin-based polymer may be a polymer prepared by polymerizing specific monomers in a specific dispersion medium, and for example, it may be derived from a composition prepared by (1) conducting radical polymerization of (meth)acrylic acid ester-based monomers with polyolefin-based monomers to prepare acid-modified polyolefin-based resin, (2) conducting a condensation reaction with highly hydrophilic polyethylene oxide (PEO) or polypropylene oxide (PPO) to prepare acid-modified polyolefin-based resin with increased hydrophilicity, (3) neutralizing the acid-modified polyolefin-based resin with increased hydrophilicity, and (4) adding water as a dispersion medium to granulate the acid-modified polyolefin-based resin with increased hydrophilicity.

According to the above preparation process, a 'water-dispersed composition' in which 'granulated' polyolefin-based polymer is dispersed in a dispersion medium of water may be obtained. If the 'water-dispersed composition' is used as an 'anode binder composition' instead of a common binder to prepare an anode, the dispersion medium water may be vaporized and removed during a drying process in the latter part of the preparation process, and only polyolefin polymer particles may remain in the final anode active material layer.

However, the above preparation process is no more than one example, and according to common knowledge of the art, a polymer comprising polyolefin-based repeating units; (meth)acrylic acid ester-based repeating units; and polyalkylene oxide-based repeating units may be prepared and used as a binder of the innermost layer.

Since it is based on linear polyolefin-based repeating units and does not comprise diene-based repeating units, a linear shape is generally formed and the aimed polymer may be obtained using a solvent during the polymerization process, and excellent dispersibility may be exhibited without adding an emulsifier (namely, surfactant). And, due to the linear structure, even if tetrahydrofurane is used during the preparation process, expansion or gelation of polymer is not progressed, volume expansion of a lithium ion battery may be inhibited, decrease in energy density per volume may be prevented, and increase in internal resistance may be minimized.

Optionally, the polyolefin-based polymer may further comprise unsaturated carboxylic acid based repeating units, for example (meth)acrylic acid ester-based repeating units and polyalkylene oxide-based repeating units.

In this case, a part or all of the polyolefin-based repeating units are acid-modified by the (meth)acrylic acid ester-based repeating units, and a part or all of the (meth)acrylic acid ester-based repeating units are condensation-polymerized with the polyalkylene oxide-based repeating units, thus generally forming a stable linear structure.

And, although the polyolefin-based repeating units are nonpolar and hydrophobic, the (meth)acrylic acid ester-based repeating units are polar, and the polyalkylene oxide-based repeating units are polar and highly hydrophilic.

Thus, dispersibility in the anode binder composition of the one embodiment, stability of an anode preparation process, and the like may be secured. Furthermore, due to the polarity exhibited by the (meth)acrylic acid ester-based repeating units, the copolymer particles may exhibit strong adhesion to the surface of anode active material and the surface of the anode current collector, thus contributing to the improvement in lithium ion battery life, and simultaneously, inhibit increase in the internal resistance of a lithium ion battery.

Meanwhile, the weight average molecular weight of the polyolefin-based polymer may be 50,000 to 300,000 g/mole, specifically 100,000 to 250,000 g/mole. If the weight average molecular weight of the polymer is less than 50,000 g/mole, sufficient mechanical strength may not be exhibited, and thus, adhesion and electrochemical life characteristic may be deteriorated, and if the weight average molecular weight of the polymer is greater than 300,000 g/mole, water dispersibility may be rapidly lowered, and thus, stable water-dispersed particles may not be formed.

The polyolefin-based polymer may comprise, based on 100 parts by weight of the polyolefin-based repeating units, 2 to 30 parts by weight, specifically 5 to 20 parts by weight of the (meth)acrylic acid ester-based repeating units, and 1 to 10 parts by weight, specifically 3 to 7 parts by weight of the polyethylene oxide (PEO) or polypropylene oxide (PPO)-based repeating units.

Within these ranges, copolymer particles having small expansion to an electrolyte, and excellent adhesion to an anode current collector and anode active material, and minimizing increase in the internal resistance of a battery may be prepared. However, these ranges are no more than examples, and the above embodiment is not limited thereto.

Optionally, the polyolefin-based polymer may comprise, based on 100 parts by weight of the polyolefin-based repeating units, 10 to 70 parts by weight of the (meth)acrylic acid ester-based repeating units. In this case, polarity of the copolymer particles may be further increased, but the above embodiment is not limited thereto.

Meanwhile, during the preparation process of polyolefin-based polymer as explained above, the step of (3) neutralizing the acid-modified polyolefin-based resin with increased hydrophilicity may comprise dissolving the acid-modified polyolefin-based resin with increased hydrophilicity in tetrahydrofurane at a temperature of 65° C. or more, and then, gradually adding a basic compound to neutralize.

According to the introduction amount of the basic compound, average particle diameter of copolymer particles in the finally obtained water-dispersed composition may be controlled. Specifically, based on 100 parts by weight of the acid-modified polyolefin-based resin with increased hydrophilicity, it may be introduced in an amount of 1 to 10 parts by weight, specifically 1 to parts by weight, and thereby, it may be confirmed that when analyzing copolymer particles in the finally obtained water-dispersed composition with a particle size analyzer (Nicomp), the average particle diameter is 100 to 300 nm, specifically 150 nm or more and 250 nm or less.

If the average particle diameter of the copolymer particles is greater than 300 nm, it may be difficult to stably disperse in water, and if it is less than 100 nm, anode adhesion may be deteriorated, thus having an adverse influence on the electrochemical life characteristic of a lithium ion battery including the same.

Binders of Anode Active Material Layers Other than the Innermost Layer: Different Kind of Polymer from the Polyolefin-Based Polymer In the anode of the one embodiment, heterogeneous polymer applied as binder in the layers other than the innermost layer among the plurality of anode active material layers is not specifically limited as long as it is a different kind of polymer from the polyolefin-based polymer.

For example, commonly known styrene-butadiene-based polymer, styrene-acryl-based polymer, or a mixture thereof may be applied as a binder in the layers other than the innermost layer.

In general, it is known that styrene-butadiene-based polymer has excellent adhesion and small expansion to an electrolyte but has high resistance, compared to styrene-acryl-based polymer, and to the contrary, styrene-acryl-based polymer has low resistance but has low adhesion and large expansion to an electrolyte, compared to styrene-butadiene-based polymer.

As such, commonly known binders respectively have advantage and disadvantage, but according to the one embodiment, polyolefin-based polymer is applied as a binder of the innermost layer to secure sufficient binding force between the innermost layer-anode current collector and low resistance, and commonly known binders are applied in the layers thereon, thereby forming a stable interface with a separator.

Anode Active Material and Conductive Agent of Each Anode Active Material Layer

As explained above, in the plurality of anode active material layers, materials except binder (namely, anode active material, conductive agent, and the like) may be identical or different in each anode active material layer. And, materials included in each anode active material layer, except binder, are not specifically limited.

Specifically, in the anode of the one embodiment, each anode active material layer independently comprises material capable of reversibly intercalating/deintercalating lithium ions, lithium metal, alloy of lithium metal, material capable of doping and dedoping lithium, or transition metal oxide.

As the material capable of reversibly intercalating/deinterclating lithium ions, any carbonaceous anode active material commonly used in lithium ion rechargeable batteries may be used, and representative examples thereof may include crystalline carbon, noncrystalline carbon or a combination thereof. Examples of the crystalline carbon may include graphite such as amorphous, plate, flake, spherical or fiber type natural graphite or artificial graphite, and examples of the noncrystalline carbon may include soft carbon (low temperature baked carbon) or hard carbon, mesophase pitch carbide, baked cokes, and the like.

As the alloy of lithium metal, alloys of lithium and metal such as Na, K, Rb, Cs, Fr, Be, Mg, Ca, Sr, Si, Sb, Pb, In, Zn, Ba, Ra, Ge, Al or Sn may be used.

As the material capable of doping and dedoping lithium, Si, $SiO_x$ (0<x<2), Si—C composite, Si-Q alloy (Q is alkali metal, alkali earth metal, Group 13 to 16 elements, transition metal, rare earth elements or a combination thereof, and is not Si), Sn, $SnO_2$, Sn—C composite, Sn—R (R is alkali metal, alkali earth metal, Group 13 to 16 elements, transition metal, rare earth elements or a combination thereof, and is not Si), and the like may be mentioned. As specific elements of Q and R, Mg, Ca, Sr, Ba, Ra, Sc, Y, Ti, Zr, Hf, Rf, V, Nb, Ta, db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po or a combination thereof may be mentioned.

As the transition metal oxide, vanadium oxide, lithium vanadium oxide, and the like may be mentioned.

For example, each anode active material layer may independently comprise at least one carbonaceous anode active material selected from artificial graphite, natural graphite, soft carbon, hard carbon, or a mixture thereof.

Meanwhile, the anode active material layer may further comprise a conductive agent. The conductive agent is used to afford conductivity to an electrode, any electronically conductive materials which do not induce chemical changes in a battery may be used, and for example, conductive materials including carbonaceous material such as natural graphite, artificial graphite, carbon black, acetylene black, ketjen black, carbon fiber, and the like; metallic material such as metal powder or metal fiber of copper, nickel, aluminum, silver and the like; conductive polymer such as polyphenylene derivatives; or a mixture thereof may be used.

For example, each anode active material may independently comprise at least one carbonaceous conductive agent selected from the group consisting of acetylene black, carbon black, ketjen black, carbon fiber, or a mixture thereof.

Contents of Materials Included in Each Anode Active Material Layer

In the one embodiment, materials included in each anode active material layer may be used in the content known in the art. However, it is also possible to control the content of binder included in each layer, the content in the innermost layer among the total anode active material layers, and the like, considering the properties of binder included in each anode active material layer.

For example, based on the total weight (100 wt %) of the innermost layer, the content of the polyolefin-based polymer may be adjusted to 0.5 wt % or more, 1.0 wt % or more, or 1.5 wt % or more, and 5.0 wt % or less, 4.0 wt % or less, or 3.0 wt % or less.

And, based on the total weight (100 wt %) of the anode active material layer comprising heterogeneous polymer, the content of the heterogeneous polymer may be adjusted to 0.5 wt % or more, 1.0 wt % or more, or 1.5 wt % or more, and 4.0 wt % or less, 3.5 wt % or less, or 3.0 wt % or less.

And, based on the total weight (100 wt %) of the plural anode active material layers, the weight of the innermost layer may be adjusted to 30 wt % or more, 32 wt % or more, 34 wt % or more, 36 wt % or more, or 38 wt % or more, and 80 wt % or less, 78 wt % or less, 76 wt % or less, 74 wt % or less, or 72 wt % or less.

For example, when the plural anode active material layers have two-layer structure, the amount of loading of the innermost layer may be 2 to 14 $mg/cm^2$, and the amount of loading of the second anode active material layer may be 2 to 14 $mg/cm^2$, per one side of the anode current collector.

However, the above content ranges are no more than examples, and the content ranges can be modified by the construction of binder, other materials included in anode active material layers, and the like, and not limited thereto.

Meanwhile, the anode of the one embodiment may exhibit excellent adhesion as explained above.

For example, in Examples described below, when the anode active material layer positioned on the other side of the anode current collector in the anode is adhered to a glass substrate, and the anode is pulled at a peel speed of 1 to 10 mm/min and peel angle of 180° at a temperature of 20 to 30° C., peel strength of the anode active material layer from the glass substrate was measured to be 7 gf/cm or more and 150 gf/cm or less, for example, 10 gf/cm or more and 100 gf/cm or less.

However, the measurement value of anode adhesion may be modified by the construction of a binder, and other materials included in the anode active material layer, and the like, and not limited thereto.

Preparation Method

A method for preparing the anode of the one embodiment is not specifically limited.

For example, many binder free slurries comprising anode active material and conductive agents may be prepared, and then, a binder composition may be mixed with each binder free slurry. To each binder free slurry, a thickener such as carboxymethyl cellulose may be added, and the added amount is not specifically limited.

Wherein, as the binder composition, a polyolefin-based polymer composition may be prepared by the above described method. Separately, a latex comprising styrene-butadiene-based polymer, styrene-acryl-based polymer, or a mixture thereof may be prepared by commonly known methods.

If the binder free slurry is mixed with the polyolefin-based polymer composition, a slurry for forming the innermost layer (namely, a first anode active material layer) may be formed, and if the binder free slurry is mixed with the latex comprising styrene-butadiene-based polymer, styrene-acryl-based polymer, or a mixture thereof, slurry for forming anode active material layers other than the innermost layer (namely, a second anode active material layer, a third anode active material layer, and so on.) may be formed.

Thereafter, by commonly known method, the slurry for forming the innermost layer may be coated on the anode current collector, and then, the slurry for forming anode active materials other than the innermost layer may be coated two or more times, and then, dried and rolled.

Wherein, a drying process may be included between coating processes for forming adjacent anode active material layers to prepare an anode in which boundaries are clearly formed between adjacent anode active material layers.

To the contrary, an anode in which mixed layers are formed at the interface between adjacent anode active material layers may be prepared without including a drying process between coating processes for forming adjacent anode active material layers.

Although the latter (batch drying) has been selected in terms of process efficiency in one embodiment described below, the effect during the operation of a battery is almost identical regardless of drying method, and thus, the drying method is not specifically limited.

Lithium Rechargeable Battery

According to another embodiment of the present disclosure, there is provided a lithium rechargeable battery comprising the anode of the above embodiment; an electrolyte; and a cathode.

The anode of the above embodiment may effectively increase binding force between the anode current collector and innermost layer, and minimize resistance of an anode including the same, thereby inhibiting capacity reduction during the operation of a lithium rechargeable battery including the same.

In addition, in the anode of the above embodiment, heterogeneous polymer capable of compensating the polyolefin-based polymer in terms of resistance, binding force, an interface with a separator, and the like may be applied as a binder of the layers other than the innermost layer, and thus, more remarkable synergistic effect can be expected.

A lithium rechargeable battery comprising the anode of the above embodiment may exhibit low resistance, and minimize capacity reduction during long term operation, as explained above.

Hereinafter, explanations overlapped with the above will be omitted, and an anode and a lithium ion battery of the above embodiments will be explained in detail.

The lithium rechargeable battery of one embodiment may further comprise a separator between the cathode and the anode.

The lithium rechargeable battery may be classified into a cylindrical, prismatic, coin type, pouch type, and the like according to the used shape, and into bulk type and thin film type according to the size. The structure and manufacturing method of the batteries are widely known in the art, and thus, will be explained at a minimum.

First, the anode comprises an anode current collector and an anode active material formed on the anode current collector, wherein the anode active material layer may have a multilayer structure as explained above.

In addition, as the anode current collector, one selected from the group consisting of copper foil, nickel foil, stainless steel foil, titanium foil, nickel foam, copper foam, conductive metal-coated polymer substrate, and combinations thereof may be used.

Meanwhile, the cathode comprises a current collector and a cathode active material layer formed on the current collector. As the cathode active material, compounds capable of reversibly intercalating and deintercalating lithium (lithiated intercalation compounds) may be used. Specifically, one or more composite oxides of metal selected from cobalt, manganese, nickel and combinations thereof and lithium may be used. More specifically, compounds represented by any one of the following Chemical Formulas may be used.

$Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $LiE_{1-b}X_bO_{2-c}D_c$ (0≤b≤0.5, 0≤c≤0.05); $LiE_{2-b}X_bO_{4-c}D_c$ (0≤b≤0.5, 0≤c≤0.05); $Li_aNi_{1-b-c}Co_bX_cD_\alpha$ (0.90≤a≤1.8, 0≤b≤0.5, 0≤c≤0.05, 0<α≤2); $Li_aNi_{1-b-c}Co_bXcO_{2-\alpha}T_\alpha$ (0.90≤a≤1.8, 0≤b≤0.5, 0≤c≤0.05, 0<α<2); $Li_aNi_{1-b-c}Co_bX_cO_{2-\alpha}T_2$ (0.90≤a≤1.8, 0≤b≤0.5, 0≤c≤0.05, 0<α<2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0<α<2); $Li_aNi_{1-b-c}Mn_bX_cO_{2-\alpha}T_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dGeO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $LiaCoGbO2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $Li_aMnG_bPO_4$ (0.90≤a≤1.8, 0.001≤b≤0.1); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $LiFePO_4$ In the Chemical Formula, A is selected from the group consisting of Ni, Co, Mn, and combinations thereof; X is selected from the group consisting of Al, Ni, Co, Mn, Cr, Fe, Mg, Sr, V, rare earth elements and combinations thereof; D is selected from the group consisting of O, F, S, P, and combinations thereof; E is selected from the group consisting of Co, Mn, and combinations thereof; T is selected from the group consisting of F, S, P, and combinations thereof; G is selected from the group consisting of Al, Cr, Mn, Fe, Mg, La, Ce, Sr, V, and combinations thereof; Q is selected from the group consisting of Ti, Mo, Mn, and combinations thereof; Z is selected from the group consisting of Cr, V, Fe, Sc, Y, and combinations thereof; J is selected from the group consisting of V, Cr, Mn, Co, Ni, Cu, and combinations thereof.

The compounds having a coating layer on the surface may be also used, or the above compounds may be used in combination with the compounds having a coating layer. The coating layer may comprise at least one coating element compound selected from the group consisting of oxide of coating element, hydroxide of coating element, oxyhydroxide of coating element, oxycarbonate of coating element, and hydroxycarbonate of coating element. The compound constituting the coating layer may be amorphous or crystalline. As the coating element included in the coating layer, Mg, Al, Co, K, Na, Ca, Si, Ti, V, Sn, Ge, Ga, B, As, Zr or a mixture thereof may be used. As a process of forming a coating layer, any coating method may be used as long as it uses these elements in the above compounds to coat without adversely influencing the properties of cathode active material (for example, spray coating, dipping, and the like), which is easily understood to one of ordinary knowledge in the art and the detailed explanations will be omitted.

The cathode active material layer comprises a cathode binder and a conductive agent.

The cathode binder functions for sufficiently attaching cathode active material particles with each other, or sufficiently attaching the cathode active material to a current collector, and as the cathode binder, a binder for a lithium rechargeable battery comprising a copolymer comprising the repeating units 8 and 9, as explained above, may be used.

As the cathode binder, polyvinylalcohol, carboxymethylcellulose, hydroxypropylcellulose, diacetylcellulose, polyvinylchloride, carboxylated polyvinylchloride, polyvinylfluoride, polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like may be also used, but it is not limited thereto.

The conductive agent is used to afford conductivity to an electrode, any electronically conductive materials which do not induce chemical changes in a battery may be used, and for example, natural graphite, artificial graphite, carbon black, acetylene black, ketjen black, carbon fiber, metal powder of copper, nickel, aluminum, silver and the like, may be used, and one or more kinds of conductive materials such as polyphenylene derivatives may be used.

And, as the current collector, Al may be used, but it is not limited thereto.

The anode and the cathode may be respectively prepared by mixing active material, conductive agent and binder in a solvent to prepare active material slurry, and coating the composition on a current collector. The manufacturing method of an electrode is widely known in the art, and the detailed explanations will be omitted herein. As the solvent, N-methylpyrrolidone, and the like may be used, but it is not limited thereto.

Meanwhile, the lithium rechargeable battery may be a non-aqueous electrolyte rechargeable battery, wherein the non-aqueous electrolyte may comprise a non-aqueous organic solvent and lithium salts.

The non-aqueous organic solvent functions as a medium where ions involved in the electrochemical reactions of a battery may move.

And, as mentioned above, a separator may exist between the anode and the cathode. As the separator, polyethylene, polypropylene, polyvinylidene fluoride or multilayers thereof may be used, and mixed multilayers such as polyethylene/polypropylene two layer separator, polyethylene/polypropylene/polyethylene three layer separator, polypropylene/polyethylene/polypropylene three layer separator, and the like may be also used.

Hereinafter, preferable examples of the present disclosure will be described. However, these examples are no more than preferable examples, and the present disclosure is not limited thereby.

Preparation Example 1: A Polyolefin-Based Polymer Composition and Anode Active Material Slurry Comprising the Same (1) Preparation of a Binder Composition
1) Preparation of Acid-Modified Polyolefin Resin Into a 1000 mL 4-neck flask equipped with a stirrer, a reflux condenser, a thermometer and a dropping funnel, 250 g of polyolefin-based resin (polypropylene homopolymer, Tm 160° C., weight average molecular weight 100,000), 25 g of maleic anhydride, 37.5 g of (meth)acrylic acid ester and 300 g of toluene were heated and dissolved at 110° C. for 3 hours under nitrogen atmosphere.

While maintaining the temperature in the 4-neck flask at 110° C. or more, 5 g of a radical polymerization initiator dicumylperoxide was gradually introduced through a dropping funnel. Thereafter, the reaction mixture was additionally reacted for more than 5 hours so that a radical polymerization reaction may be completely progressed.

After the reaction was completed, the product was cooled to a room temperature, and then, introduced into a large quantity of acetone to precipitate acid-modified polyolefin-based resin. Thus obtained acid-modified polyolefin-based resin was washed with acetone several times to completely remove unreacted substances. Thereafter, it was dried under reduced pressure at a temperature of 50° C. or more in a reduced pressure dryer.

2) Preparation of Acid-Modified Polyolefin Resin with Increased Hydrophilicity 50 g of the acid-modified polyolefin-based resin was introduced into a 500 mL high pressure reactor equipped with a stirrer, a thermometer, and a pressure gauge, and 100 mL of toluene, 2.5 g of polyethylene oxide (molecular weight 400), 0.25 g of p-toluene sulfonic acid monohydrate, and 0.025 g of hydroquinone were introduced therein, and the mixture was heated to 155° C. for 15 hours, thus progressing condensation polymerization. After cooling the resulting polymer to a room temperature, it was neutralized with 2.5 g of $K_2CO_3$ and washed with acetone several times, and then, dried under reduced pressure to obtain acid-modified polyolefin resin with increased hydrophilicity.

3) Neutralization of Acid-Modified Polyolefin Resin with Increased Hydrophilicity Into a 1000 mL 3-neck flask equipped with a reflux condenser and a thermometer, 40 g of the acid-modified polyolefin resin with increased hydrophilicity was completely dissolved with 20 g of tetrahydrofurane at 70° C. for more than 1 hour, and 1.2 g of N,N-dimethylethanolamine was gradually added as a basic compound to neutralize.

4) Preparation of Water Dispersed Composition of Polyolefin-Based Resin Particles After completely adding 1.2 g of the N,N-dimethylethanolamine, while maintaining a temperature inside the 3-neck flask at 70° C., 200 g of water was gradually introduced to obtain a water-dispersed composition of polyolefin-based resin particles, which was used as a binder composition of Preparation Example 1.

In the binder composition of Preparation Example 1, the average particle diameter (D50) of polyolefin-based resin particles was measured to be 110 nm by a particle size analyzer (Nicomp), and the weight average molecular weight was measured to be 200,000 g/mol by GPC.

(2) Preparation of Anode Active Material Slurry 100 g of the aqueous solution of carboxymethyl cellulose (solid content: 1.0 wt %) was used as a thickener, 1.5 g of acetylene black was used as a conductive agent, and the mixture was stirred for 1 hour to prepare a conductive agent dispersion.

Into the conductive agent dispersion, 95 g of anode active material artificial graphite (D50: 20 μm) and 20 g of distilled water were introduced, and stirred for 1 hour to prepare binder free slurry.

Into the binder free slurry, the binder composition of Preparation Example 1 (solid content: 20 wt %, 12.5 g) was introduced, and stirred for 30 minutes to obtain anode active material slurry of Preparation Example 1.

Preparation Example 2: A Styrene-Butadiene-Based Binder Composition and Anode Active Material Slurry Comprising the Same (1) Preparation of a Binder Composition Styrene-butadiene copolymer particles having weight ratio of styrene units and butadiene units of 60:40 (styrene:butadiene) were dispersed in water to prepare latex having solid content of 40 wt % (6.25 g), which was used as a binder composition of Preparation Example 2.

(2) Preparation of Anode Active Material Slurry

A binder free slurry was prepared by the same method as Preparation Example 1.

Thereafter, into the binder free slurry, the binder composition of Preparation Example 2 (solid content: 40 wt %, 6.25 g) was introduced, and stirred for 30 minutes to obtain anode active material slurry of Preparation Example 2.

Preparation Example 3: A Styrene-Acryl-Based Binder Composition and Anode Active Material Slurry Comprising the Same (1) Preparation of a Binder Composition Styrene-acryl copolymer particles having weight ratio of styrene units and acryl units of 40:60 (styrene:acryl) were dispersed in water to prepare latex having solid content of 40 wt % (6.25 g), which was used as a binder composition of Preparation Example 3.

(2) Preparation of Anode Active Material Slurry

A binder free slurry was prepared by the same method as Preparation Example 1.

Thereafter, into the binder free slurry, the binder composition of Preparation Example 3 (solid content: 40 wt %, 6.25 g) was introduced, and stirred for 30 minutes to obtain anode active material slurry of Preparation Example 3.

Preparation Example 4: A Styrene-Butadiene and Styrene-Acryl Mixed Binder Composition and Anode Active Material Slurry Composing the Same (1) Preparation of a Binder Composition 40 wt % (3.125 g) of the styrene-butadiene-based binder of Preparation Example 2 and 40 wt % (3.125 g) of the styrene-acryl-based binder of Preparation Example 3 were mixed and used as a binder composition of Preparation Example 4.

(2) Preparation of Anode Active Material Slurry

A binder free slurry was prepared by the same method as Preparation Example 1.

Thereafter, into the binder free slurry, the binder composition of Preparation Example 4 (solid content: 40 wt %, 6.25 g) was introduced, and stirred for 30 minutes to obtain anode active material slurry of Preparation Example 4.

Example 1

(1) Preparation of an Anode

On both sides of an anode current collector, an anode active material layer of a two-layer structure was respectively formed, and on each side, polyolefin-based polymer was included in the first anode active material layer directly contacting the anode current collector, and styrene-butadiene-based binder was included in the second anode active material layer positioned on the first anode active material layer.

Specifically, a copper foil with a thickness of 10 μm was used as an anode current collector. On both sides of the anode current collector, the anode active material slurry of Preparation Example 1 was respectively coated using a comma coater (coating amount per one side: 5 mg/cm$^2$), and then, hot air dried in an oven of 80° C. for 10 minutes to form first anode active material layers.

On the first anode active material layers of both sides, the anode active material slurry of Preparation Example 2 was respectively coated using a comma coater (coating amount per one side: 5 mg/cm$^2$), and then, hot air dried in an oven of 80° C. for 10 minutes to form second anode active material layers.

As such, on both sides of the anode current collector, the first anode active material layer and second active material layer were respectively formed, and then, rolled to the total thickness of 140 μm to obtain an anode of Example 1.

(2) Preparation of a Lithium Ion Battery

As cathode active material, 92 g of $Li_{1.03}Ni_{0.6}Co_{0.6}Mn_{0.2}O_2$ and 4.0 g of acetylene black were used, and as a binder, 40 g (10% solid content) of polyvinylidene fluoride (PVdF) was used, and they were stirred in a solvent of NMP for 1 hour to prepare a cathode active material slurry composition such that the total solid content became 70 wt %.

An aluminum foil with a thickness of 20 μm was prepared and used as a cathode current collector, and using a comma coater, the cathode active material slurry composition was coated on both sides of the cathode current collector in the loading amount of 19.0 mg/cm$^2$ per one side, and then, hot air dried in an oven of 80° C. for 10 minutes, and rolled to the total thickness of 140 μm. Thereby, a cathode of Example 1 was obtained.

A separator was inserted between the anode and cathode of Example 1 to assemble, and then, an electrolyte was injected, and a lithium ion battery was completed by a method commonly known in the art.

As the electrolyte, an electrolyte prepared by dissolving $LiPF_6$ in a mixed solvent of ethylene carbonate (EC), propylene carbonate (PC) and diethyl carbonate (DEC) (weight ratio of EC:PC:DEC=3:2:5) to the concentration of 1.3M, and adding fluoroethylene carbonate (FEC) in the content of 10 wt %, based on the total weight of the electrolyte, was used.

Example 2

(1) Preparation of an Anode

On both sides of an anode current collector, an anode active material layer of a two-layer structure was respectively formed, and on each side, polyolefin-based polymer was included in the first anode active material layer directly contacting the anode current collector, and styrene-acryl-based binder was included in the second anode active material layer positioned on the first anode active material layer.

An anode of Example 2 was obtained by the same method as Example 1, except that the anode active material slurry of Preparation Example 3 was used instead of the anode active material slurry of Preparation Example 2, which was used to form the second anode active material layer in Example 1.

(2) Preparation of a Lithium Ion Battery

A lithium ion battery of Example 2 was prepared by the same method as Example 1, except that the anode of Example 2 was used instead of the anode of Example 1.

Example 3

(1) Preparation of an Anode

On both sides of an anode current collector, an anode active material layer of a two-layer structure was respectively formed, and on each side, polyolefin-based polymer was included in the first anode active material layer directly contacting the anode current collector, and styrene-butadiene and styrene-acryl mixed binder was included in the second anode active material layer positioned on the first anode active material layer.

An anode of Example 3 was obtained by the same method as Example 1, except that the anode active material slurry of Preparation Example 4 was used instead of the anode active material slurry of Preparation Example 2, which was used to form the second anode active material layer in Example 1.

(2) Preparation of a Lithium Ion Battery

A lithium ion battery of Example 3 was prepared by the same method as Example 1, except that the anode of Example 3 was used instead of the anode of Example 1.

Example 4

(1) Preparation of an Anode

On both sides of an anode current collector, an anode active material layer of a three-layer structure was respectively formed, and on each side, polyolefin-based polymer was included in the first anode active material layer directly contacting the anode current collector, and styrene-butadiene-based binder was included in the second anode active material layer positioned on the first anode active material layer, and styrene-acryl-based binder was included in the third anode active material layer positioned on the second anode active material layer.

An anode of Example 4 was obtained by the same method as Example 1, except that as a first active material layer, the first anode active material layer of Example 1 was used in the loading of 4 mg/cm$^2$, as a second anode active material layer, the second anode active material layer of Example 1 was used in the loading of 3 mg/cm$^2$, and as a third anode active material layer, the second anode active material layer of Example 2 was used in the loading of 3 mg/cm$^2$.

(2) Preparation of a Lithium Ion Battery

A lithium ion battery of Example 4 was prepared by the same method as Example 1, except that the anode of Example 4 was used instead of the anode of Example 1.

Example 5

(1) Preparation of an Anode

On both sides of an anode current collector, an anode active material layer of a three-layer structure was respectively formed, and on each side, polyolefin-based polymer was included in the first anode active material layer directly contacting the anode current collector, and styrene-acryl-based binder was included in the second anode active material layer positioned on the first anode active material layer, and styrene-butadiene-based binder was included in the third anode active material layer positioned on the second anode active material layer.

An anode of Example 5 was obtained by the same method as Example 1, except that as a first active material layer, the first anode active material layer of Example 1 was used in the loading of 4 mg/cm$^2$, as a second anode active material layer, the second anode active material layer of Example 2 was used in the loading of 3 mg/cm$^2$, and as a third anode active material layer, the second anode active material layer of Example 1 was used in the loading of 3 mg/cm$^2$.

(2) Preparation of a Lithium Ion Battery

A lithium ion battery of Example 5 was prepared by the same method as Example 1, except that the anode of Example 5 was used instead of the anode of Example 1.

Comparative Example 1

(1) Preparation of an Anode

On both sides of an anode current collector, an anode active material layer of a single layer structure was respectively formed, and styrene-butadiene-based binder was included in the anode active material layers.

Specifically, a copper foil with a thickness of 10 μm was used as an anode current collector, and, on both sides of the anode current collector, the anode active material slurry of Preparation Example 2 was respectively coated using a comma coater (coating amount per one side: 10 mg/cm$^2$), and then, hot air dried in an oven of 80° C. for 10 minutes to form first anode active material layers.

As such, on both sides of the anode current collector, an anode active material layer of a single layer was respectively formed, and then, rolled to the total thickness of 140 μm to obtain an anode of Comparative Example 1.

(2) Preparation of a Lithium Ion Battery

A lithium ion battery of Comparative Example 1 was prepared by the same method as Example 1, except that the anode of Comparative Example 1 was used instead of the anode of Example 1.

Comparative Example 2

(1) Preparation of an Anode

On both sides of an anode current collector, anode active material layer of a single layer structure was respectively formed, and styrene-acryl-based binder was included in the anode active material layers.

An anode of Comparative Example 2 was obtained by the same method as Comparative Example 1, except that the anode active material slurry of Preparation Example 3 was used instead of the anode active material slurry of Preparation Example 2, which was used to form the first anode active material layer in Comparative Example 1.

(2) Preparation of a Lithium Ion Battery

A lithium ion battery of Comparative Example 2 was prepared by the same method as Comparative Example 1, except that the anode of Comparative Example 2 was used instead of the anode of Comparative Example 1.

Comparative Example 3

(1) Preparation of an Anode

On both sides of an anode current collector, an anode active material layer of a two-layer structure was respectively formed, and on each side, styrene-butadiene-based binder was included in the first anode active material layer directly contacting the anode current collector, and styrene-acryl-based binder was included in the second anode active material layer positioned on the first anode active material layer.

An anode of Comparative Example 3 was obtained by the same method as Example 1, except that the anode active material slurry of Preparation Example 2 was used instead of the anode active material slurry of Preparation Example 1, which was used to form the first anode active material layer in Example 1, and the anode active material slurry of Preparation Example 3 was used instead of the anode active material slurry of Preparation Example 2, which was used to form the second anode active material layer in Example 1.

(2) Preparation of a Lithium Ion Battery

A lithium ion battery of Comparative Example 3 was prepared by the same method as Comparative Example 1, except that the anode of Comparative Example 3 was used instead of the anode of Comparative Example 1.

Comparative Example 4

(1) Preparation of an Anode

On both sides of an anode current collector, an anode active material layer of a single layer structure was respectively formed, and polyolefin-based binder was included in the anode active material layers.

An anode of Comparative Example 4 was obtained by the same method as Comparative Example 1, except that the anode active material slurry of Preparation Example 1 was used instead of the anode active material slurry of Preparation Example 2, which was used to form the first anode active material layer in Comparative Example 1.

(2) Preparation of a Lithium Ion Battery

A lithium ion battery of Comparative Example 4 was prepared by the same method as Comparative Example 1, except that the anode of Comparative Example 4 was used instead of the anode of Comparative Example 1.

Comparative Example 5

On both sides of an anode current collector, an anode active material layer of a two-layer structure was respectively formed, and on each side, in both the first anode active material layer directly contacting the anode current collector and the second anode active material layer positioned on the first anode active material layer, polyolefin-based binder was included but the content was varied.

In order to form active material layers having different binder contents, polyolefin binder-containing slurry distinguished from that of Preparation Example 1 was separately prepared.

Into the conductive agent dispersion of Preparation Example 1, 96 g of artificial graphite was introduced as anode active material, and 20 g of distilled water was introduced, and then, the solution was stirred for 1 hour to prepare binder free slurry.

Into the binder free slurry, the binder composition of Preparation Example 1 (solid content: 20 wt %, 7.5 g) was introduced, and stirred for 30 minutes to obtain a separate anode active material slurry.

An anode of Comparative Example 5 was obtained by the same method as Example 1, except that the separate anode active material slurry was used instead of the anode active material slurry of Preparation Example 2, which was used to form the second anode active material layer in Example 1.

(2) Preparation of a Lithium Ion Battery

A lithium ion battery of Comparative Example 5 was prepared by the same method as Comparative Example 1, except that the anode of Comparative Example 5 was used instead of the anode of Comparative Example 1.

Experimental Example 1

Examples 1 to 5, and Comparative Examples 1 to 5 were evaluated as follows, and the results were reported in the following Table 1.

Anode adhesion: In a 25° C. constant temperature chamber, the anode active material layer of each anode was adhered to a glass substrate, and when the anode was pulled at a peel speed of 5 mm/min and peel angle of 180°, peel strength of the anode active material layer of the anode from the glass substrate was measured.

Initial discharge resistance of a battery: In a constant temperature chamber of 25° C., from the state when SOC (state of charge) of each lithium ion battery is 50%, voltage drop generated during 150A discharge for 10 seconds was reported, and DC-resistance value was calculated using R=V/I (Ohm's law).

Capacity retention after 1000 cycles of a battery: In a constant temperature chamber of 25° C., each lithium ion battery was charged to 4.15 V at 54 A in CC/CV mode, and then, discharged to 3.0 V in CC mode, which was set as one cycle, and total 1000 cycles were progressed with pauses of 20 minutes between the charge and discharge. The rate of discharge capacity measured in the $1000^{th}$ cycle to the discharge capacity measured in the 1st cycle was calculated.

TABLE 1

|  | Anode adhesion | Initial discharge resistance of battery | Capacity retention after 1000 cycles of battery |
| --- | --- | --- | --- |
| Example 1 | 38 gf/cm | 1.4 mΩ | 93% |
| Example 2 | 36 gf/cm | 1.3 mΩ | 92% |
| Example 3 | 37 gf/cm | 1.3 mΩ | 92% |
| Example 4 | 37 gf/cm | 1.3 mΩ | 92% |
| Example 5 | 37 gf/cm | 1.4 mΩ | 92% |
| Comparative Example 1 | 36 gf/cm | 1.5 mΩ | 89% |
| Comparative Example 2 | 32 gf/cm | 1.3 mΩ | 88% |
| Comparative Example 3 | 35 gf/cm | 1.4 mΩ | 89% |
| Comparative Example 4 | 33 gf/cm | 1.5 mΩ | 93% |
| Comparative Example 5 | 27 gf/cm | 1.3 mΩ | 92% |

According to Table 1, it is confirmed that Examples 1 to 5 exhibit evenly improved properties in terms of anode adhesion, initial discharge resistance of a battery, and capacity retention after 1000 cycles of a battery. This is related to the properties of binders included in the anode active material layers.

Specifically, with repeated contraction and expansion of the volume of active material in the anode during the operation of a battery, binding force by a binder may be weakened.

Such a phenomenon may be more worsen as the binder has higher affinity to an electrolyte. As the binder has higher affinity to an electrolyte, more electrolyte is impregnated inside, and it may become difficult to accept volume change of active material.

Furthermore, as the binding force by a binder in an anode is weakened, resistance may be further increased, and a battery including the same may be deteriorated and an electrolyte may be irreversibly consumed.

Finally, if a binder having high affinity to an electrolyte is applied to an anode, binding force of an anode may be gradually weakened during the operation of a battery, resistance may increase, battery performance may be deteriorated, an electrolyte may be irreversibly consumed and battery life may be shortened.

Practically, it is confirmed that compared to the cases wherein styrene-butadiene-based binder (Comparative Example 1) and styrene-acryl-based binder (Comparative Example 2) having high affinities to an electrolyte were respectively used to form an anode active material layer of a single layer, in the case of using polyolefin-based binder without affinity to an electrolyte to form an anode active material of a single layer, battery life increased more.

However, in case polyolefin-based binder is used to form an anode active material layer of a single layer (Comparative Example 4), anode adhesion is low compared to the case of using styrene-butadiene-based binder (Comparative Example 1), and the initial resistance of a battery is high compared to the case of using styrene-acryl-based binder (Comparative Example 2), and thus, improvement is needed.

In this regard, examining the case of using styrene-butadiene-based binder and styrene-acryl-based binder in each anode active material layer to form a two-layer structure (Comparative Example 3), compared to the case of using polyolefin-based binder to form an anode active material layer of a single layer (Comparative Example 4), the initial resistance of a battery was lowered but life was further reduced on the contrary.

As explained above, it is considered that by using binders having high affinities to an electrolyte, the binding force of an anode was gradually weakened and resistance increased during the operation of a battery, the performance of a battery was deteriorated and an electrolyte was irreversibly consumed, and thus, battery life was reduced.

Meanwhile, examining the case of forming a multilayer structure with varied contents of polyolefin-based binder (Comparative Example 5), compared to the case of forming a single layer structure with a constant content of polyolefin-based binder (Comparative Example 4), the initial discharge resistance of a battery decreased, but binding force was weakened.

Namely, although simple controlling of the distribution degree of polyolefin-based binder in a thickness direction of an anode may partly contribute to decrease in the initial discharge resistance of a battery, it may weaken the binding force of an anode, and may have an adverse influence on the battery life during the operation of more than 1000 cycles.

To the contrary, in Examples 1 to 5, an anode active material layer comprising polyolefin-based binder was directly formed on an anode current collector (a first anode active material layer), and one or two anode active material layers were additionally formed thereon and styrene-butadiene-based binder, styrene-acryl-based binder or a mixture was applied in each layer.

Wherein, since the polyolefin-based binder applied in the innermost layer does not have affinity to an electrolyte, little expansion may be generated during electrolyte impregnation, and high binding force may be maintained even during the operation of a battery.

And, the styrene-butadiene-based binder, styrene-acryl-based binder or a mixture applied in the anode active material layer(s) thereon may effectively offset the drawbacks of the polyolefin-based binder (namely, it is difficult to lower the internal resistance of a battery compared to styrene-acryl-based binder, and difficult to realize high adhesion compared to styrene-butadiene-based binder).

In other words, forming an anode active material layer comprising polyolefin-based binder directly on an anode current collector (first anode active material layer), and forming one or two anode active material layers thereon and applying styrene-butadiene-based binder, styrene-acryl-based binder or a mixture in each layer would contribute to realize evenly improved properties in terms of the initial discharge resistance and discharge resistance during the operation of a battery, and battery life, and the like.

Furthermore, the number of anode active material layers formed on the innermost layer or the kind of binders may be designed according to the aimed battery properties. It can be obviously derived by one of ordinary knowledge in the art, referring to the above explanations and Examples 1 and 5.

The present disclosure is not limited to the Examples but can be made in various forms, and it will be understood by one of ordinary knowledge in the art that the present disclosure may be practiced in other forms without modifying the technical idea or essential characteristics. Therefore, it should be understood that Examples described above are exemplary in all aspects and not limitative.

The invention claimed is:

1. An anode for a lithium rechargeable battery comprising:
   an anode current collector; and
   a plurality of anode active material layers sequentially stacked on the anode current collector,
   wherein the plurality of anode active material layers includes an innermost layer directly contacting the anode current collector comprising a polyolefin-based polymer as a binder, and at least one additional layer, wherein the at least one additional layer comprises heterogeneous polymer as a binder,
   wherein the polyolefin-based polymer is a copolymer comprising polyolefin-based repeating units; (meth)acrylic acid ester-based repeating units; and polyalkylene oxide-based repeating units.

2. The anode for a lithium rechargeable battery according to claim 1, wherein the plurality of anode active material layers includes 2 or 3 total anode active material layers that are stacked.

3. The anode for a lithium rechargeable battery according to claim 1, wherein the plurality of anode active material layers are included on both sides of the anode current collector.

4. The anode for a lithium rechargeable battery according to claim 1, wherein the innermost layer of the plurality of anode active material layers comprises a first anode active material layer contacting one side or both sides of the anode current collector, and wherein the first anode active material layer comprises a first anode active material, a first conductive agent and the polyolefin-based polymer; and
   the at least one additional layer includes a second anode active material layer contacting a side of the first anode active material layer, and wherein the second anode active material layer comprises a second anode active material, a second conductive agent, and the heterogeneous polymer.

5. The anode for a lithium rechargeable battery according to claim 4, wherein the plurality of anode active material layers further comprises a third anode active material layer contacting a side of the second anode active material layer, and wherein the third anode active material layer comprises a third anode active material, a third conductive agent, and the heterogeneous polymer.

6. The anode for a lithium rechargeable battery according to claim 1, wherein the copolymer further comprises unsaturated carboxylic acid-based repeating units.

7. The anode for a lithium rechargeable battery according to claim 1, wherein a weight of the innermost layer is 30 to 80 wt % based on a total weight of the plurality of anode active material layers.

8. The anode for a lithium rechargeable battery according to claim 4, wherein an amount of polyolefin-based polymer is 0.5 to 5 wt % based on a total weight of the first anode active material layer.

9. The anode for a lithium rechargeable battery according to claim 1, wherein the heterogeneous polymer comprises styrene-butadiene-based polymer, styrene-acryl-based polymer or a mixture thereof.

10. The anode for a lithium rechargeable battery according to claim 1, wherein an amount of the heterogeneous polymer is 0.5 to 4.0 wt % based on a total weight of the at least one additional layer.

11. The anode for a lithium rechargeable battery according to claim 1, wherein each of the plurality of anode active material layers independently comprises at least one carbonaceous anode active material selected from the group consisting of artificial graphite, natural graphite, soft carbon, hard carbon, and a mixture thereof.

12. The anode for a lithium rechargeable battery according to claim 1, wherein each of the plurality of anode active material layers independently comprises at least one carbonaceous conductive agent selected from the group consisting of acetylene black, carbon black, ketjen black, carbon fiber, and a mixture thereof.

13. A lithium rechargeable battery comprising
the anode of claim 1;
an electrolyte;
a cathode; and
a separator.

* * * * *